United States Patent
Horton et al.

(10) Patent No.: US 6,751,994 B2
(45) Date of Patent: Jun. 22, 2004

(54) METHOD AND APPARATUS FOR FORMING A STRUCTURAL MEMBER

(75) Inventors: Frank A. Horton, Rochester Hills, MI (US); Gianfranco Gabbianelli, Troy, MI (US); Richard Ashley, Berkley, MI (US)

(73) Assignee: Magna International Inc., Aurora (CA)

( * ) Notice: Subject to any disclaimer, the term of this patent is extended or adjusted under 35 U.S.C. 154(b) by 2 days.

(21) Appl. No.: 10/154,930

(22) Filed: May 28, 2002

(65) Prior Publication Data

US 2003/0221468 A1 Dec. 4, 2003

(51) Int. Cl.[7] .......................... B23P 17/00; B21D 39/00
(52) U.S. Cl. .............................. 72/55; 72/707; 72/430; 72/56; 29/421.1; 29/419.2
(58) Field of Search .............................. 72/55, 56, 707, 72/705, 430; 29/419.2, 421.1, 523

(56) References Cited

U.S. PATENT DOCUMENTS

| | | | |
|---|---|---|---|
| 2,976,907 A | 3/1961 | Harvey et al. | |
| 3,394,569 A | 7/1968 | Smith | |
| 3,797,294 A | 3/1974 | Roth | |
| 4,285,224 A | 8/1981 | Shkatov et al. | |
| 4,531,393 A | 7/1985 | Weir | |
| 5,353,617 A | 10/1994 | Cherian et al. | |
| 5,457,977 A | 10/1995 | Wilson | |
| 5,730,016 A | 3/1998 | Zittel | |
| 5,826,320 A | 10/1998 | Rathke et al. | |
| 5,964,127 A | 10/1999 | Steingroever | |
| 5,983,478 A | 11/1999 | Dolan et al. | |
| 6,050,121 A | 4/2000 | Daehn et al. | |
| 6,065,317 A | 5/2000 | Steingroever | |
| 6,092,865 A | 7/2000 | Jaekel et al. | |
| 6,128,935 A | 10/2000 | Daehn et al. | |
| 6,227,023 B1 | 5/2001 | Daehn et al. | |
| 6,467,146 B1 * | 10/2002 | Herman | 72/56 |
| 6,484,384 B1 * | 11/2002 | Gibson et al. | 72/56 |
| 6,497,030 B1 * | 12/2002 | Marando | 29/421.1 |
| 6,564,605 B1 * | 5/2003 | Gafri et al. | 72/56 |

FOREIGN PATENT DOCUMENTS

| | | |
|---|---|---|
| DE | 199 09 928 A1 | 12/2000 |
| GB | 2 086 284 | 5/1982 |
| JP | 59064125 | 12/1984 |
| RU | 2 043 180 C1 | 9/1995 |
| WO | WO 00/76685 | 12/2000 |

* cited by examiner

Primary Examiner—David Jones
(74) Attorney, Agent, or Firm—Pillsbury Winthrop LLP

(57) ABSTRACT

A method of forming a structural member includes hydroforming the blank to form a hydroformed member and finishing the hydroformed member by positioning the wall of the hydroformed member between a die surface and an electromagnetic discharging element having a non-circular cross-section, and actuating the electromagnetic discharging element so that the metallic wall of the hydroformed member presses against the die surface.

22 Claims, 7 Drawing Sheets

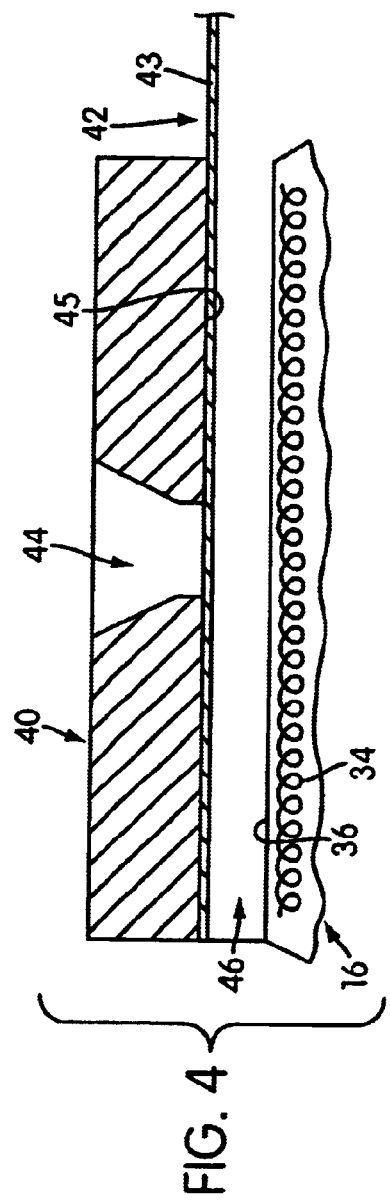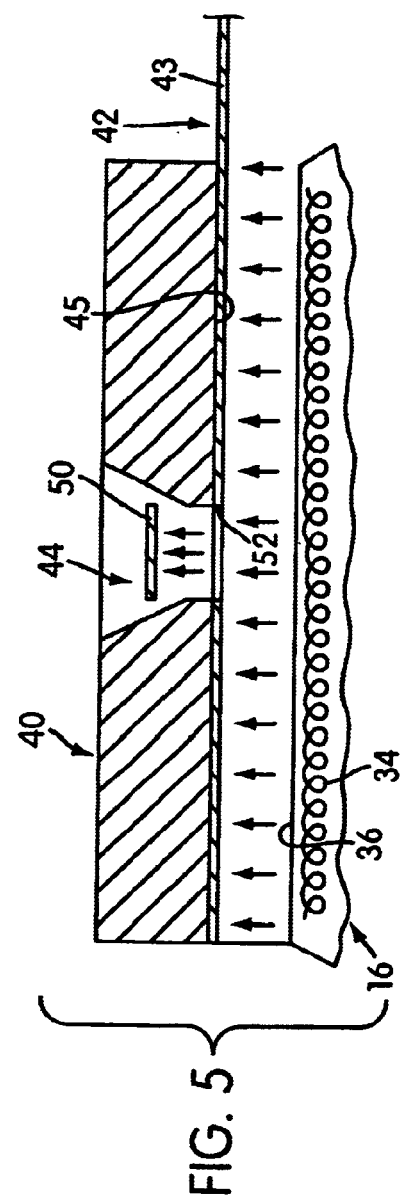

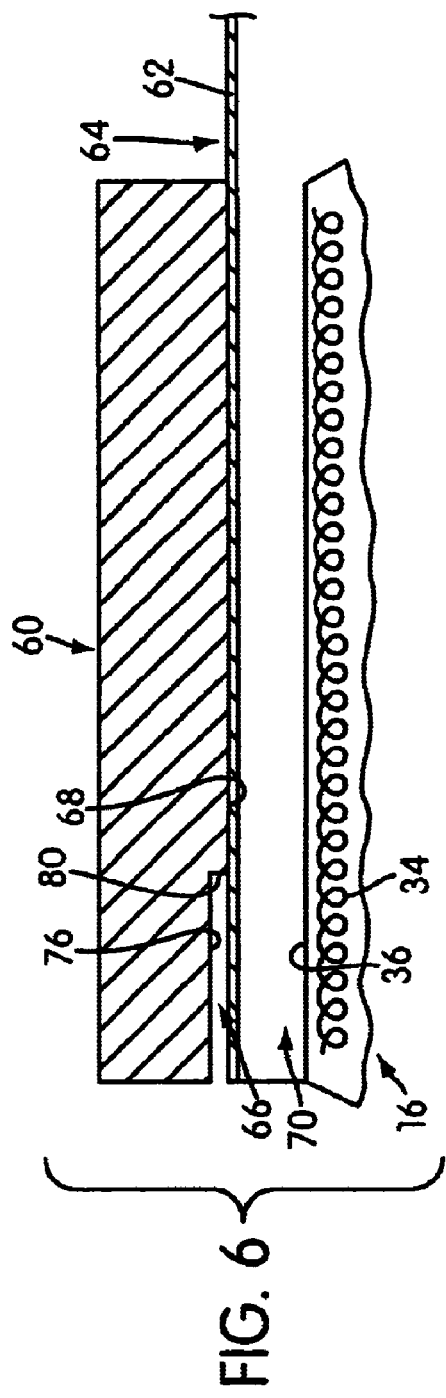
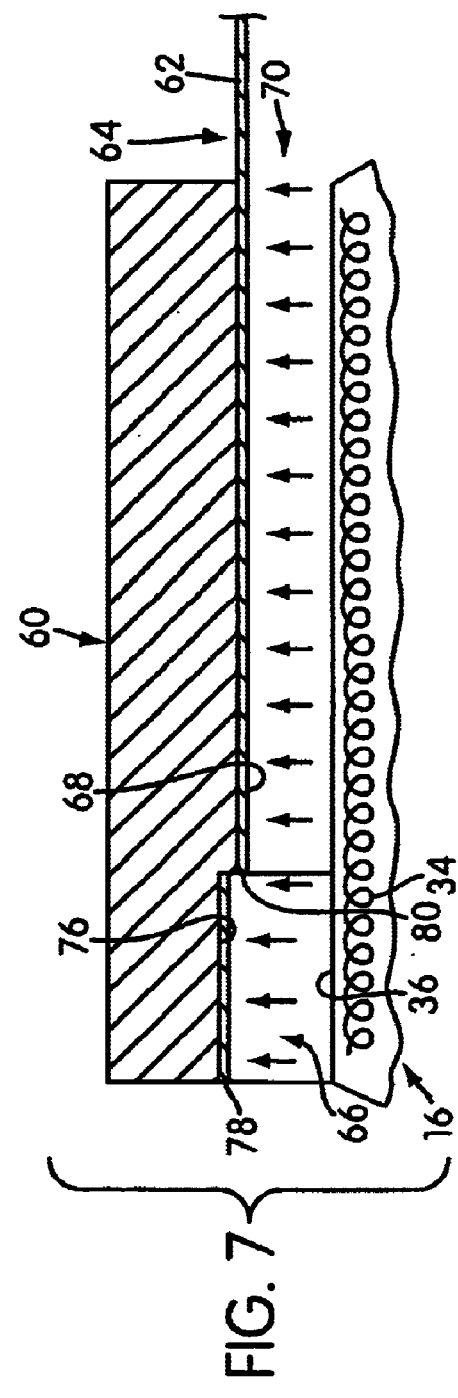

METHOD AND APPARATUS FOR FORMING A STRUCTURAL MEMBER

FIELD OF THE INVENTION

The present invention relates to motor vehicle manufacturing. More specifically, the illustrative embodiments of the present invention relate to methods and apparatuses for making hydroformed structural members, that may be used in motor vehicle frame construction.

BACKGROUND

It is known to construct motor vehicle frames which incorporate one or more hydroformed members. A hydroformed frame component may be further processed or "finished" after hydroforming to its final configuration. Finishing may be carried out by, for example, laser cutting. However, laser cutting is time consuming and expensive.

SUMMARY

The present invention can be embodied in a method of forming a structural member, the method comprising providing a blank having a tubular metallic wall, hydroforming the blank to form a hydroformed member by a method comprising providing a hydroforming die assembly having a hydroforming die cavity defined by hydroforming surfaces, positioning the blank and the hydroforming die assembly such that the blank is within the hydroforming die cavity, and providing a high pressure fluid into an interior of the blank to expand the wall of the blank outwardly into conformity with the hydroforming die surfaces, and applying electromagnetic energy to the hydroformed member by a method comprising, providing a second die with a second die surface, positioning the wall of the hydroformed member between the second die surface and an electromagnetic discharging element having a non-circular cross-section, and actuating the electromagnetic discharging element so that the metallic wall of the hydroformed member presses against the second die surface.

The present invention can also be embodied in a method of forming a structural member, the method comprising providing a tubular member with a longitudinal axis and having a non-circular cross-section transverse to the longitudinal axis being formed by a tubular metallic wall, providing a die having a die surface, positioning the tubular member in the die, providing a tubular electromagnetic discharging element with a longitudinal axis and having a non-circular cross-section transverse to the longitudinal axis, inserting a non-circular electromagnetic discharging element into the tubular member, the non-circular cross-section of the electromagnetic discharging element closely following and corresponding to the non-circular cross-section of the tubular member; and actuating the electromagnetic discharging element so that the wall of the tubular member presses against the die surface.

The present invention may also be embodied in a method of forming a structural member, the method comprising providing a longitudinal axis member having a non-circular cross-section transverse to the longitudinal axis being formed by a tubular metallic wall, forming a hole in the member extending completely through the tubular metallic wall by electromagnetic discharge by a method comprising providing a die with a die surface, the die surface having an opening, positioning the tubular metallic wall between an electromagnetic discharging element and the die surface, and actuating the electromagnetic discharging element so that the tubular metallic wall is forced against the die surface and against the opening to form the hole.

Other aspects, features, and advantages of the present invention will become apparent from the following detailed description of the illustrated embodiments, the accompanying drawings, and the appended claims.

BRIEF DESCRIPTION OF THE DRAWINGS

FIGS. 4 and 5 are cross-sectional views taken through the line 4—4 of FIG. 3 and illustrate a method utilizing the electromagnetic die assembly for forming a hole extending completely through a metallic wall of a hydroformed member;

FIGS. 6 and 7 are cross-sectional views similar to FIGS. 4 and 5, respectively, except illustrating a method utilizing the electromagnetic die assembly for forming an end portion of a metallic wall of a hydroformed member;

DETAILED DESCRIPTION OF ILLUSTRATED EMBODIMENTS

The present invention is generally directed to apparatuses and methods for using electromagnetic energy to form structural members of the type that may be used, for example, in the construction of motor vehicles. The methods of the present invention may utilize one or more electromagnetic discharges to move the metallic material of a wall or walls of a workpiece against the die surfaces of a die to trim, pierce and/or shape the workpiece. The methods and apparatuses of the present invention may be used to trim, pierce, and/or to change the shape of a structural member having an open cross-section such as an open cross-section hydroformed member, for example, or a structural member having a closed cross-section such as a tubular hydroformed member, for example. Other open cross-section and closed cross-section structures may also be processed according to the methods of the present invention.

Figure 1:
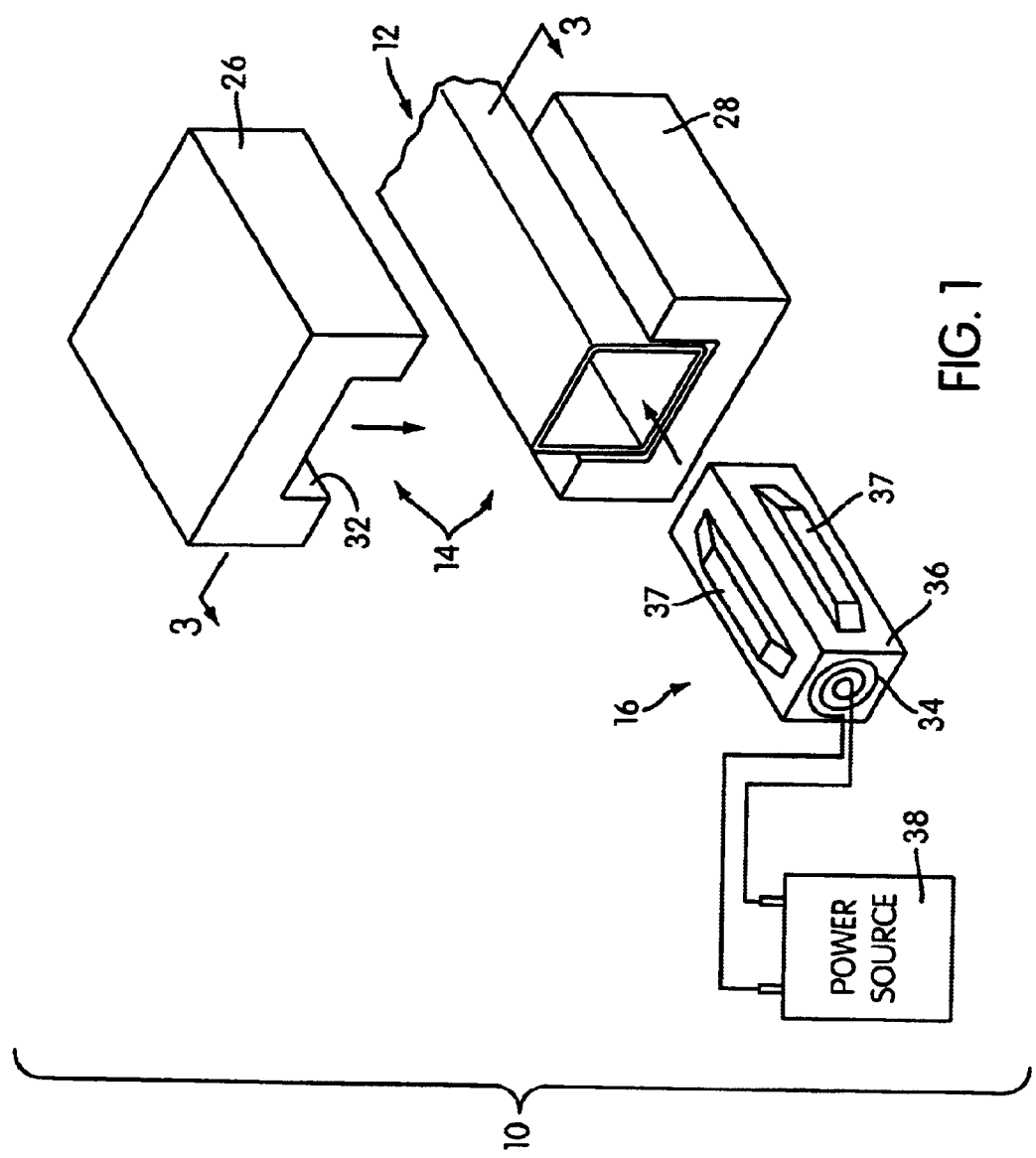
FIG. 1 shows a view of an electromagnetic die assembly in accordance with one illustrated embodiment of the present invention.

FIG. 1 shows an illustrative embodiment of an electromagnetic die assembly 10 which may be used to process or finish (i.e., trim, pierce and/or change the shape of) a workpiece which may be in the form of a tubular hydroformed member 12. The electromagnetic die assembly 10 includes a die 14 and an electromagnetic discharging element 16. The portion of the member 12 to be processed is placed in the die 14 and the discharging element 16 is inserted into the member 12 so that the walls of the member 12 are positioned between the surfaces of the die cavity of the die 14 and the discharging element 16. When the discharging element 16 is actuated, the metallic wall of the member 12 presses against the surfaces of the cavity of the die 14. The surfaces of the die 14 may be constructed to trim, pierce and/or change the shape of the wall of the hydroformed member 12. Processing the hydroformed member 12 using an electromagnetic die assembly is fast and inexpensive relative to finishing processes that are currently used. The use of an electromagnetic die assembly according to the principles of the present invention reduces or eliminates the need to process the hydroformed member 12 using more expensive and/or time consuming methods, such as by laser cutting. An electromagnetic die assembly according to the present invention can also be used to create structural members having complex three-dimensional shapes that have heretofore not been commercially feasible.

Generally, tubular hydroformed members are formed by placing a tubular metallic blank 15 into the cavity of a hydroforming die assembly (not shown) and providing a high pressure fluid into an interior of the blank 15. The blank is positioned in a first die half of the hydroforming die assembly and a second die half is placed on top of the blank and on top of the first die half. A hydroforming fluid is injected into each end of the blank. The fluid expands the metallic wall of the blank 15 outwardly into conformity with the die surfaces of the die cavity so that the blank 15 permanently assumes a new shape determined by the shape of the die cavity to form the hydroformed member 12. The blank 15 may have a uniform circular cross-section and the hydroformed member 14 may have a non-uniform and non-circular cross-section. The details of tubular hydroforming are disclosed, for example, in commonly assigned U.S. Pat. No. 6,092,865 to Jaekel et al., the entire disclosure of which is hereby incorporated herein by reference thereto.

Figure 2:
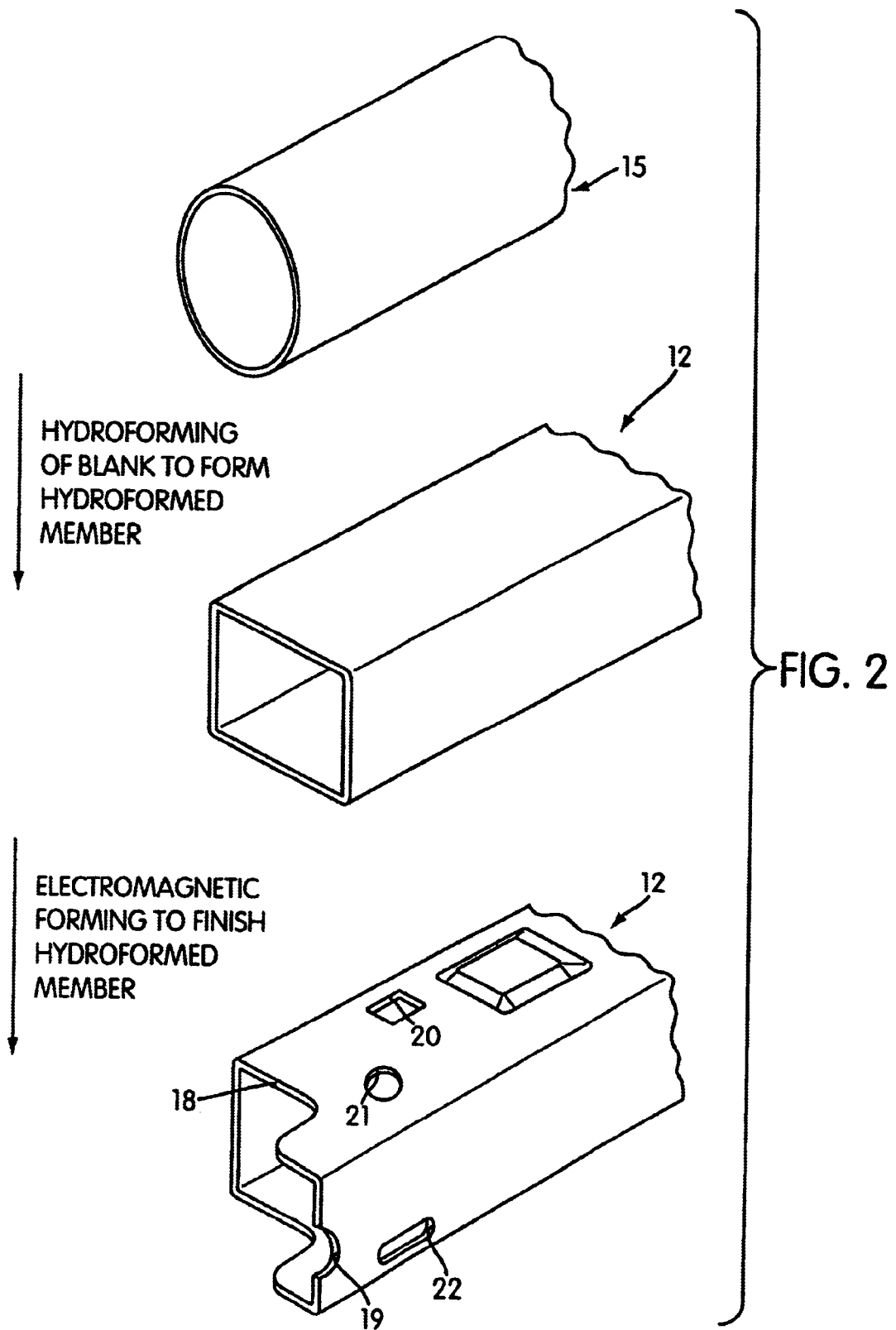
FIG. 2 is a view illustrating several stages of the construction of an example finished hydroformed member from a blank in accordance with one embodiment of the present invention.

Tubular hydroformed members are used in many applications including, for example, as structural members such as pillars and side rails for motor vehicle frame construction. As seen in FIG. 2, hydroformed member 12 is first hydroformed and then may be trimmed, pierced and/or shaped after removal from the hydroforming die to form one or more notches or cut out sections 18, 19 in an end portion thereof, to pierce one or more openings 20, 21, 22 through interior wall portions thereof, and/or to shape wall portions of the member 12 to form various structures such as protrusions 23 or recesses (not shown) therein. The electromagnetic die assembly 10 can be constructed and operated to form any of these types of example structural features 18–23 alone or in combination.

Figure 3:
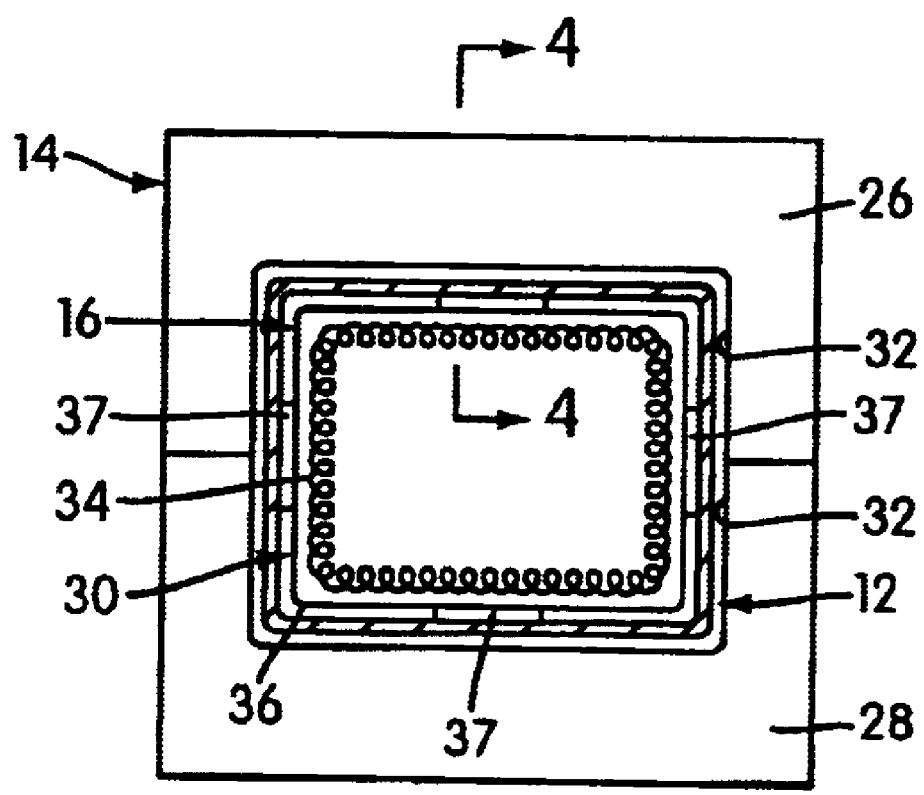
FIG. 3 is a cross-section taken generally through the line 3—3 of FIG. 1.

As seen in FIGS. 1 and 3, the die 14 of the electromagnetic die assembly 10 is comprised of first and second die halves 26, 28, respectively. The hydroformed member 12 is placed in the first die half 26 and the second die half 28 is placed on top of the hydroformed member 12 and on top of the first die half 26. The first and second die halves 26, 28 cooperate to form a die cavity 30. The discharging element 16 is placed in the interior of the hydroformed member 12 so that the walls of the hydroformed member 12 are positioned between the die surfaces 32 of the die cavity 30 and the discharging element 16. The die cavity 30 encloses the portion of the hydroformed member 12 to be processed. The hydroformed member 12 is made of an electrically conductive material, such as steel. The die 14 includes inserts that have high resistance to electrical conductive material. The inserts are non-electrically conductive and absorb the electromagnetic pulse that occurs during discharge of the discharging element 16. Examples of materials suitable materials that can be used to construct the inserts are stainless steel and ceramic.

The discharging element 16 may be comprised of a conductive coil 34 that is mounted within a housing 36. The housing 36 includes a plurality of spacers 37 that may be used to help position and/or secure the discharging element within the interior of the hydroformed member 12 (FIG. 3). The coil 34 is electrically connected to a power source 38 which provides electrical power for the processing operation. The power source 38 may, for example, include a capacitor that is discharged to energize the coil 34. The discharging element 16 is placed in the tubular interior of the hydroformed member 12 so that the discharging element is positioned along a portion of the length of the hydroformed member 12 and so that the discharging element 16 is positioned within the cavity 30. Various materials and circuitry can be employed for the die assembly 10 and the discharging element 16, such as those disclosed in U.S. Pat. Nos. 2,976,907 to Harvey et al., and 5,353,617 to Cherian et al., the complete disclosures of each patent being hereby incorporated herein by reference thereto, respectively.

The portion of the hydroformed member 12 that is disposed within the cavity and 30 has a non-circular cross-section. The electromagnetic discharging element 16 also has a non-circular cross-section which closely follows and corresponds to the non-circular cross-section of the tubular member 12 in which it is secured. When the discharging element 16 is actuated, the power source 38 causes an electrical current to flow through the coil 34 of the discharging element 16 which generates a magnetic field. The shape of the magnetic field generated by the coil 34 is in part determined by the shape of the coil 34. Consequently, the coil 34 is shaped to produce a magnetic field that closely corresponds to the non-circular shape of the portion of the hydroformed member 12 to be processed. The close correspondence between the shape of the discharging element 16 and the shape of the portion of the hydroformed member 12 in which it is disposed can be appreciated from FIG. 3. The spacers 37 of the discharging element 16 may engage the inner surface of the hydroformed member 12 by interference fit prior to actuation of the discharge element 16 to locate the discharging element 16 within the hydroformed member 12.

The magnetic field produced by the coil 34 induces a current in the hydroformed member 12 which produces another magnetic field. The interaction of these magnetic fields causes the portion of the metallic wall of the hydroformed member within the cavity 30 to expand outwardly at a high rate of speed into conformity with the wall surfaces 32 of the cavity 30. As explained below, the wall surfaces 32 of the cavity 30 are constructed as desired to provide appropriate structure for trimming, piercing and/or shaping portions of the wall of the hydroformed member 12. It is generally known in the art how to use an electromagnetic pulse to move a conductive material at a high rate of speed into contact with a surface of a die. The details of this operation are not considered in depth herein but are described in, for example, U.S. Pat. Nos. 2,976,907 and 5,353,617, each of which is incorporated into the present application, as set forth above.

The shape and construction of the interior surface of the die cavity of a particular electromagnetic die assembly determines the configuration and shape of the finished section of the hydroformed member 12. Consequently, the interior surface of a particular die cavity may have many different constructions.

The hydroformed member 12 is, thus, formed to a shape that is close to the final shape and configuration, but appropriately sized to fit within die assembly 14. The discharge element is shaped and configured to appropriately fit within the hydroformed member 14 and correspond closely to its non-circular cross-section, whatever that shape and configuration may be. Therefore, the shape and configuration of the die assembly 14, hydroformed member 12, and the discharge element 16 are interrelated and dependent upon the desired, final shape, size, and configuration of hydroformed member 12.

FIGS. 4 and 5, for example, show an illustrative embodiment of a first die half 40 of an electromagnetic die assembly that is suitably constructed to pierce a hole that goes completely through a wall portion of the hydroformed member 42 processed within the electromagnetic die assembly. An opening 44 is formed in the surface 45 of the die cavity 46 of the first die half 40. Prior to processing, the member 42 is inserted within the cavity 46 and a discharge element 16 is inserted within the interior of a hydroformed member 42.

FIG. 4 shows the die half 40, the hydroformed member 42 and the discharge element 16 before processing. A wall portion 43 of the member 42 may be positioned in contact with the surface of the die half 40 (as shown) or, alternatively, may be spaced from the cavity surfaces 45. The hydroformed member 42 is processed by actuating the discharging element 16. Actuating the electromagnetic discharging element 16 causes the tubular metallic wall 43 to expand rapidly outwardly so that the wall 43 presses against the die surface 45 and the opening 44. A section 50 of the rapidly expanding wall 43 that is within the opening 44 is severed when acted upon by the magnetic fields which moves the wall into contact with the surfaces of the die cavity rapidly enough to cause a portion 50 of the wall 43 to be cut out and removed during processing to form a pierced opening 52 in the processed hydroformed member 42. The size, shape and location of the pierced opening 52 corresponds to the size, shape and location of the opening 44 in the die cavity.

FIGS. 6 and 7 show an illustrative embodiment of a first die half 60 of a electromagnetic die assembly that is suitably constructed to trim an end portion of a wall portion 62 of a hydroformed member 64 processed within the electromagnetic die assembly. A recess 66 is formed in the surface 68 of the die cavity 70 of the first die half 60. Prior to processing, the member 64 is inserted within the cavity 70 and a discharge element 16 is inserted within the interior of a hydroformed member 64.

FIG. 6 shows the die half 60, the hydroformed member 64, and the discharge element 16 before processing. The wall portion 62 of the member 64 may be positioned in contact with the surface 68 of the die cavity 70 and spaced from the surface 76 of the recess 66. Actuating the electromagnetic discharging element 16 causes the tubular metallic wall 62 to expand rapidly outwardly so that the wall 62 expands outwardly and presses against the die surfaces 68, 76. An edge section 78 of the rapidly expanding wall 62 is sheared by an edge portion 80 formed in the surface 76 of the die cavity 70 so that the section 78 of the wall 62 is cut out and removed during processing to cut out an end portion of the hydroformed member 64.

Figure 8:
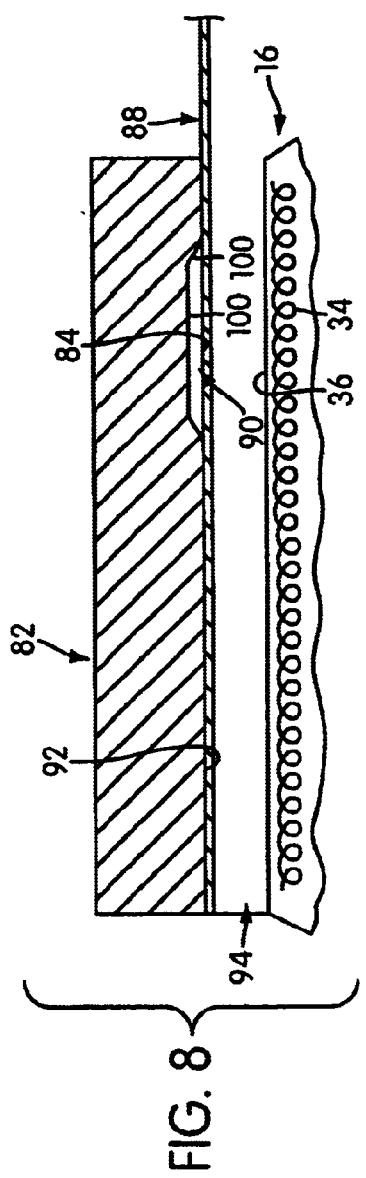
FIGS. 8 and 9 are cross-sectional views similar to FIGS. 4 and 5, respectively, except illustrating a method utilizing the electromagnetic die assembly for shaping a wall portion of a hydroformed member to form a protrusion in the metallic wall.
Figure 9:
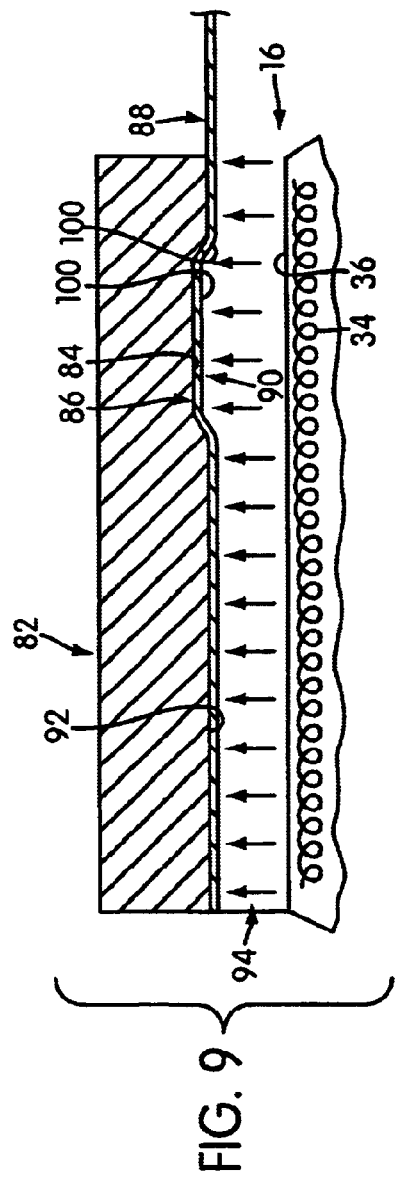

FIGS. 8 and 9 show an illustrative embodiment of a first die half 82 of a electromagnetic die assembly that is suitably constructed to change the shape of a wall portion 84 of a hydroformed member 88. In this example, a wall portion 84 is shaped to form a protrusion 86 in the metallic wall of a hydroformed member 88, but this example, as with the others, is illustrative only and not intended to limit the scope of the invention. For example, a recess could be formed in the wall of the member or other shape change could be made according to the principles of the invention. In this example, a recess 90 is formed in the surface 92 of the die cavity 94 of the first die half 82. Prior to processing as in FIG. 8, the member 88 is inserted within the cavity 94 and a discharge element 16 is inserted within the interior of a hydroformed member 88.

FIG. 8 shows the die half 82, the hydroformed member 88 and the discharge element 16 before processing. A portion of the wall 84 of the member 88 may be positioned in contact with the portions of the surface 92 of the cavity 94. The portion of the wall 84 in the vicinity of the recess 90 is spaced from the surfaces 100 defining the recess 90 prior to actuation of the discharge element 16. Actuating the electromagnetic discharging element 16 causes the tubular metallic wall 84 to expand rapidly outwardly into conformity with the die surfaces 92, 100. A portion of the wall 84 of the member 88 expands into the recess 90 to form a protrusion 86. The protrusion 86 may form an offset pad, for example, that can be used to mount a hinge or other structure on a vehicle frame. It can be appreciated that this method of shaping a hydroformed member could additionally or alternatively be used to increase or decrease the radius of a portion of an end portion or of a mid portion of a tubular member and/or to change the shape of a tubular or non-tubular member.

Figure 10:
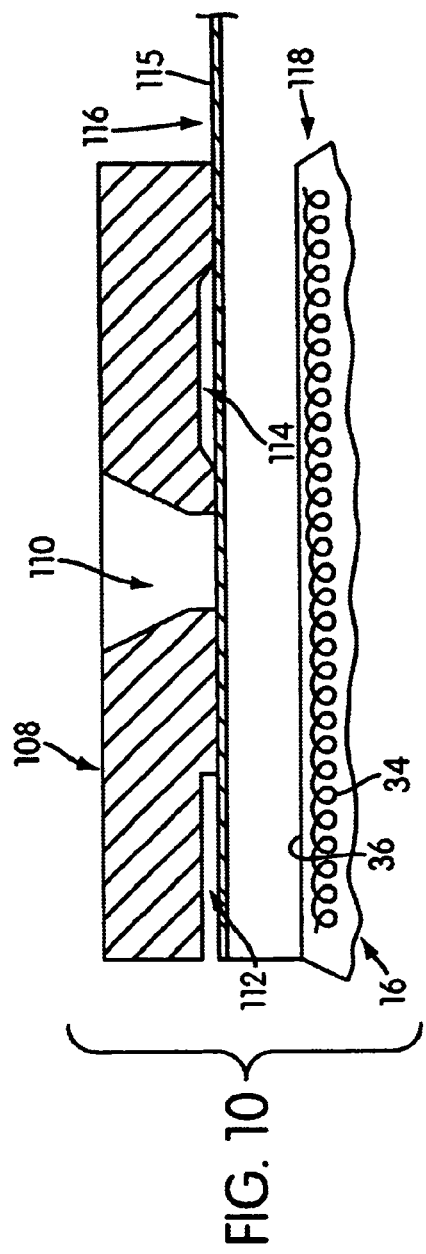
FIGS. 10 and 11 are cross-sectional views similar to FIGS. 4 and 5, respectively, except illustrating the simultaneous formation of a hole, the formation of a protrusion, and the trimming of an end portion of the metallic wall of a hydroformed member utilizing the electromagnetic die assembly.
Figure 11:
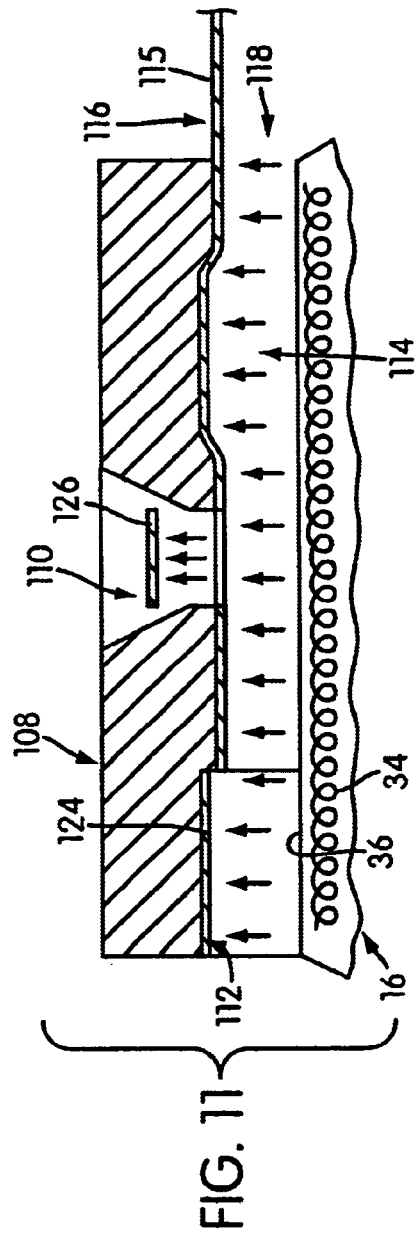

A electromagnetic die assembly according to the present invention can be constructed and operated to perform any combination of the finishing operation such as trimming (removing edge wall sections of a tubular or non-tubular member), piercing (removing interior wall sections of a tubular or non-tubular member), and/or shaping (changing the shape of edge sections and/or interior sections of a tubular or non-tubular member), in a single process. FIGS. 10 and 11 show an illustrative embodiment of a portion of an electromagnetic die assembly 108 that can be used to trim, pierce, and shape a tubular member 115 in one processing operation. FIGS. 10 and 11 show a first die half 108 of a electromagnetic die assembly 108 that includes a hole 110 (which may be similar to hole 44) suitable for piercing, a trimming recess 112 (which may be similar to recess 66) suitable for trimming and a shaping recess 114 (which may be similar to recess 90) suitable to change the shape of a wall portion 115 of a hydroformed member 116. Prior to processing, as in FIG. 10, the member 116 is inserted within the cavity 118 of the electromagnetic die assembly and a discharge element 16 is inserted within the interior of a hydroformed member 116. Actuating the electromagnetic discharging element 16 causes the tubular metallic wall 115 to expand rapidly outwardly into conformity with the die surfaces and simultaneously trim edge wall portion 124, remove interior wall portion 126 and shape a portion of the wall 115 within the recess 114.

Thus, while the invention has been disclosed and described with reference with a limited number of embodiments, it will be apparent that variations and modifications may be made thereto without departure from the spirit and scope of the invention and various other modifications may occur to those skilled in the art. Therefore, the following claims are intended to cover modifications, variations, and equivalents thereof.

What is claimed is:

1. A method of forming a structural member, comprising:
   providing a blank having a tubular metallic wall;
   hydroforming the blank to form a hydroformed member by a method comprising,
   providing a hydroforming die assembly having a hydroforming die cavity defined by hydroforming surfaces,
   positioning the blank and the hydroforming die assembly such that the blank is within the hydroforming die cavity, and
   providing a high pressure fluid into an interior of the blank to expand the wall of the blank outwardly into conformity with the hydroforming die surfaces; and
   applying electromagnetic energy to the hydroformed member by a method comprising,
   providing a second die with a second die surface,
   positioning the wall of the hydroformed member between the second die surface and an electromagnetic discharging element having a non-circular cross-section, and actuating the electromagnetic discharging element so that the metallic wall of the hydroformed member presses against the second die surface.

2. A method according to claim 1, wherein the positioning the blank in the hydroforming die assembly includes placing the blank in a first die half and locating a second die half on top of the blank and on top of the first die half.

3. A method according to claim 1, wherein the positioning the wall of the hydroformed member includes positioning the electromagnetic discharging element within the hydroformed member.

4. A method according to claim 1, wherein the positioning the wall of the hydroformed member includes placing the hydroformed member in a first die half and locating a second die half on top of the hydroformed die member and on top of the first die half.

5. A method according to claim 1, wherein the positioning the wall of the hydroformed member includes placing the electromagnetic discharging element along only a portion of the length of the hydroformed member.

6. A method according to claim 1, wherein the applying electromagnetic energy includes forming a hole extending completely through the metallic wall of the hydroformed member.

7. The method according to claim 1, wherein the applying electromagnetic energy includes cutting an end portion of the metallic wall of the hydroformed member.

8. The method according to claim 1, wherein the applying electromagnetic energy includes forming a protrusion in the metallic wall of the hydroformed member.

9. A method according to claim 1, wherein the positioning the wall of the hydroformed member includes positioning the wall of the hydroformed member between the second die surface and an electromagnetic coil.

10. A method according to claim 1, wherein the positioning the wall of the hydroformed member includes positioning the wall of the hydroformed member between the second die surface and an electromagnetic discharging element that has a non-circular cross-section that closely follows and corresponds to the non-circular cross-section of the hydroformed member.

11. A method according to claim 1, wherein prior to the positioning the wall of the hydroformed member between the second die surface and an electromagnetic discharge element, an end of hydroformed member is cut to permit insertion of the electromagnetic discharge element into the hydroformed member.

12. A method of forming a structural member, comprising:
providing a tubular member with a longitudinal axis and having a non-circular cross-section transverse to the longitudinal axis being formed by a tubular metallic wall;
providing a die having a die surface;
positioning the tubular member in the die;
providing a tubular electromagnetic discharging element with a longitudinal axis and having a non-circular cross-section transverse to the longitudinal axis;
inserting the non-circular electromagnetic discharging element into the tubular member, the non-circular cross-section of the electromagnetic discharging element closely following and corresponding to the non-circular cross-section of the tubular member; and actuating the electromagnetic discharging element so that the wall of the tubular member presses against the die surface.

13. A method according to claim 12, wherein the tubular member is formed by hydroforming prior to the inserting the electromagnetic discharging element.

14. A method according to claim 12, wherein the electromagnetic discharging element is an electromagnetic discharging coil.

15. A method according to claim 12, wherein the actuating the electromagnetic discharging element so that the wall of the tubular member presses against the die surface results in removing an end portion of the tubular member.

16. A method according to claim 12, where in the actuating the electromagnetic discharging element so that the wall of the tubular member presses against the die surface results in an operation on the tubular member selected from the group consisting of cutting an end portion, forming a hole, and forming a protrusion.

17. A method of forming a structural member, comprising:
providing a member having a tubular metallic wall;
forming a hole in the member extending completely through the tubular metallic wall by electromagnetic discharge by a method comprising:
providing a die with a die surface, the die surface having an opening,
positioning the tubular metallic wall between an electromagnetic discharging element and the die surface, and
actuating the electromagnetic discharging element so that the tubular metallic wall is forced against the die surface and against the opening to form the hole.

18. A method according to claim 17, wherein the providing a member having a tubular metallic wall includes providing a hydroformed member formed by a method comprising:
providing a hydroforming die assembly having a hydroforming die cavity defined by hydroforming die surfaces,
positioning a blank and the hydroforming die assembly such that the blank is within the hydroforming die cavity, and
providing a high-pressure fluid into an interior of the blank to expand the wall of the blank outwardly into conformity with the hydroforming die surfaces.

19. A method according to claim 17, wherein the positioning the tubular metallic wall includes positioning the electromagnetic discharging element within the member.

20. A method according to claim 17, wherein the positioning the tubular metallic wall includes placing the member in a first die half and locating a second die half on top of the member and on top of the first die half.

21. A method according to claim 17, wherein the positioning the tubular metallic member includes placing the electromagnetic discharging element along only a portion of the length of the member.

22. A method according to claim 17, wherein the positioning the tubular metallic wall includes positioning the tubular metallic wall member between an electromagnetic coil and the die surface.

* * * * *